(12) United States Patent
Williams et al.

(10) Patent No.: US 6,793,191 B1
(45) Date of Patent: Sep. 21, 2004

(54) QUICK RELEASE MECHANISM FOR USE WITH A SUPPORTING DEVICE

(75) Inventors: Jeffrey A. Williams, Downers Grove, IL (US); Grant D. Dicke, Downers Grove, IL (US)

(73) Assignee: Dicke Tool Company, Downers Grove, IL (US)

(*) Notice: Subject to any disclaimer, the term of this patent is extended or adjusted under 35 U.S.C. 154(b) by 0 days.

(21) Appl. No.: 10/616,191

(22) Filed: Jul. 9, 2003

(51) Int. Cl.[7] ............................................. F16M 11/38
(52) U.S. Cl. ....................... 248/624; 248/166; 248/170
(58) Field of Search ................................ 248/166, 168, 248/624, 188.6, 188.7, 170, 175, 163.1; 40/610, 612; 403/95, 327, 330

(56) References Cited

U.S. PATENT DOCUMENTS

| | | | |
|---|---|---|---|
| 4,548,379 A | | 10/1985 | Seely et al. |
| 4,593,879 A | | 6/1986 | Seely et al. |
| 4,694,601 A | | 9/1987 | Dicke et al. |
| 4,888,894 A | | 12/1989 | Brown, Jr. |
| 4,905,946 A | * | 3/1990 | Wang ........................ 248/170 |
| 4,954,008 A | | 9/1990 | Dicke et al. |
| 5,082,221 A | * | 1/1992 | Lai ............................ 248/168 |
| 5,102,079 A | * | 4/1992 | Lee ............................ 248/166 |
| 5,318,258 A | * | 6/1994 | Lang .......................... 248/166 |
| 5,340,068 A | | 8/1994 | Sarkisian et al. |
| 5,611,509 A | * | 3/1997 | Kulp et al. ............... 248/188.7 |
| 5,829,178 A | * | 11/1998 | Hillstrom ..................... 40/610 |
| 6,315,251 B1 | * | 11/2001 | Stoudt et al. ............... 248/156 |
| 6,315,253 B1 | | 11/2001 | Dicke et al. |
| 6,606,809 B2 | * | 8/2003 | Hillstrom et al. ............. 40/610 |
| 6,626,410 B2 | * | 9/2003 | Marcotte et al. ............ 248/548 |
| 6,685,156 B2 | * | 2/2004 | Dicke et al. ................ 248/624 |

* cited by examiner

Primary Examiner—Leslie A. Braun
Assistant Examiner—Tan Le
(74) Attorney, Agent, or Firm—Fitch, Even, Tabin & Flannery

(57) ABSTRACT

A sign stand assembly includes a sign panel, support base and an upright mast between the two. The support base defines a locking recess and a hollow leg is pivotally connected to a plate portion and extending from the support base. A locking pin and actuator are carried within the hollow leg with the actuator including an outward protruding tab. The actuator includes a clevis portion defining an opening to receive the locking pin in interlocking engagement therewith.

16 Claims, 7 Drawing Sheets

QUICK RELEASE MECHANISM FOR USE WITH A SUPPORTING DEVICE

BACKGROUND OF THE INVENTION

1. Field of the Invention

The present invention pertains to supporting devices such as those used for temporary warning signs and in particular to such support devices which employ adjustable legs and other adjustable components.

2. Description of the Related Art

It has been found convenient to provide temporary warnings alongside vehicle roadways, pedestrian walkways and other locations. Typically, temporary warning systems are erected from a collapsed or small sized storage configuration of relatively small size. Examples of leg release devices may be found in commonly assigned U.S. Pat. Nos. 4,954,008 and 6,315,253. A collapsible sign stand base for use with an upright fiberglass rib is described in U.S. Pat. No. 4,694,601 and other arrangements are shown in U.S. Pat. Nos. 4,548,379; 4,593,879 and 5,340,068. Despite the favorable acceptance of these designs, improvements are continuously being sought.

Temporary warning signs typically employ ground-engaging legs configured with a base to support an upright mast. Typically, when the sign stand is deployed, the ground-engaging legs form an angle with the upright mast that is usually larger than 90°. It is generally preferred that a storage configuration be provided in which the legs are selectively collapsed or folded to a position generally parallel with the upright mast, in order to provide a compact storage and size suitable for construction vehicles and the like.

SUMMARY OF THE INVENTION

Oftentimes, ground-supporting legs are formed from hollow, rectangular tubing. If possible, it is beneficial to locate components of a leg release assembly within the tubing to prevent unintentional snagging with nearby materials. Furthermore, if most all of the leg release components can be located within the tubing, and optimally a compact storage configuration can be realized. However, until the advent of the present invention, at least some of the leg release components have been mounted outside of the legs, in order to provide a rugged construction, sufficient to adequately retain locking pins in a desired position, despite rough handling associated with construction work, as well as vibrations due to wind gusts. Substantially all of the leg release components employed by the present invention are located within the hollow tubular legs. Exceptions include only the locking pin tip and a smooth actuator button.

It is an object of the present invention to provide a release device for use with support arrangements, such as those found in sign stands.

Another object of the present invention is to provide a release device for use with support legs of collapsible sign systems.

Yet another object of the present invention is to provide leg release devices which can be economically fabricated from a minimum number of inexpensive parts.

These and other objects according to principles of the present invention are provided in a sign stand assembly which is comprises of a sign panel, a support base, an upright mast joining the sign panel and support base. This support base includes a plurality of plate portions which define a locking recess, a plurality of legs that are pivotally connecting the legs to the plate portions. A locking pin carried on one leg, for movement toward and away from the locking recess defined by one leg. An actuator that has an end within said leg for pivotally engaging the pivotal connection. An opposed end with an outwardly protruding button that partially extends outside the leg and a medial portion within the leg that defines an opening for receiving the locking pin in interlocking engagement therewith.

DETAILED DESCRIPTION OF THE PREFERRED EMBODIMENT

Figure 1:
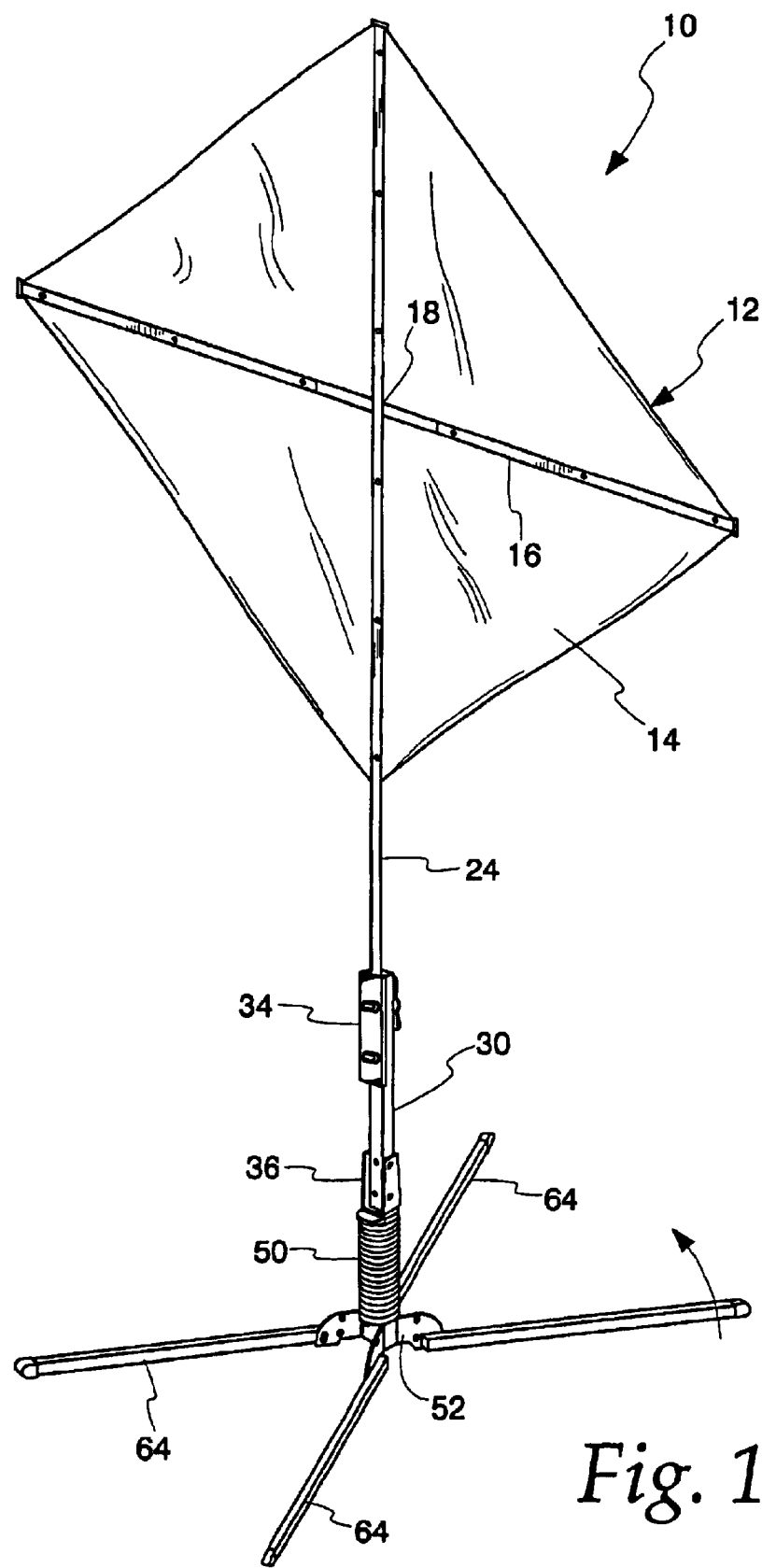
FIG. 1 is perspective view of a sign stand assembly with a release mechanism according to principles of the present invention.
Figure 2:
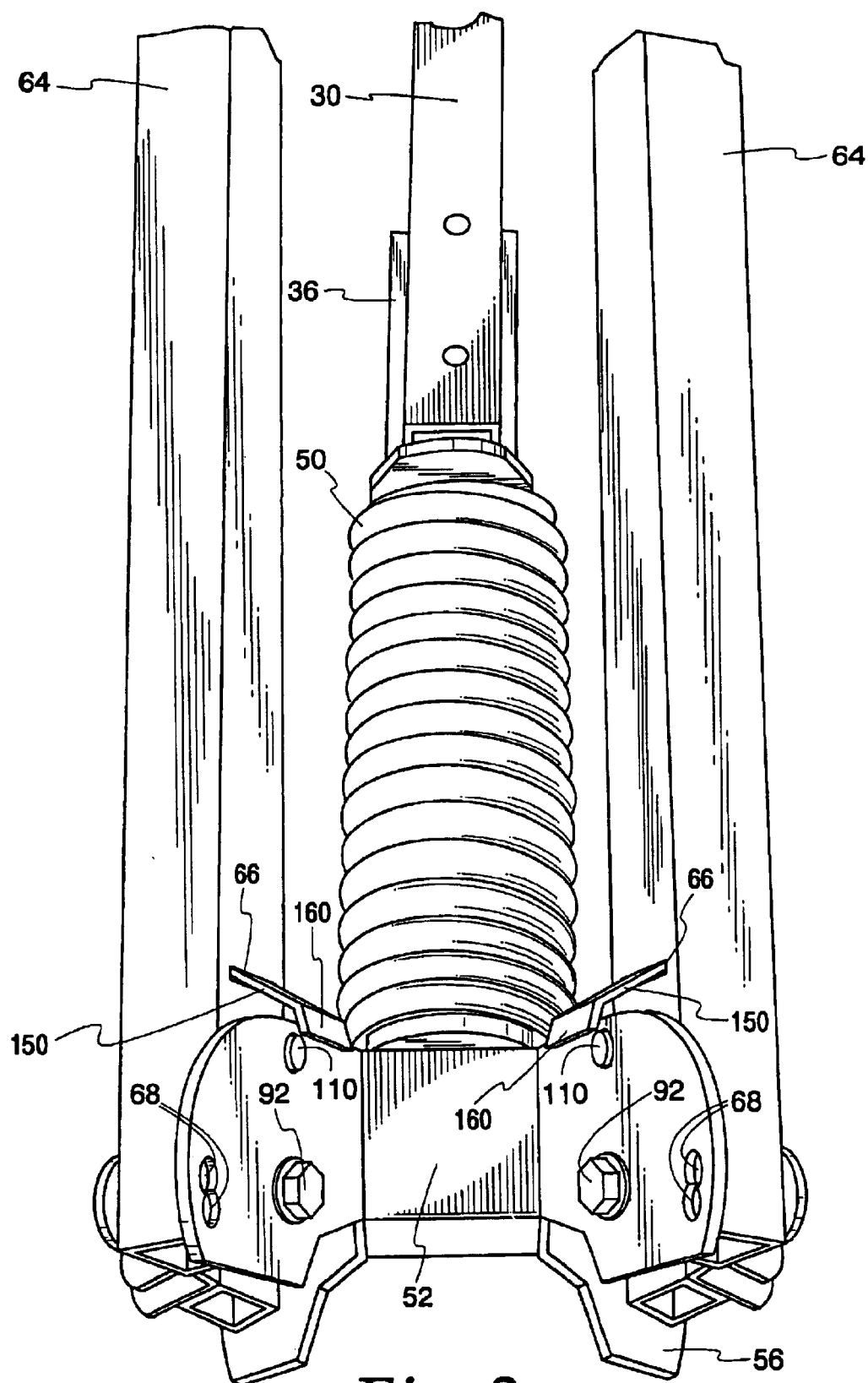
FIG. 2 is a fragmentary perspective view thereof, with the sign stand assembly shown in a collapsed position.
Figure 3:
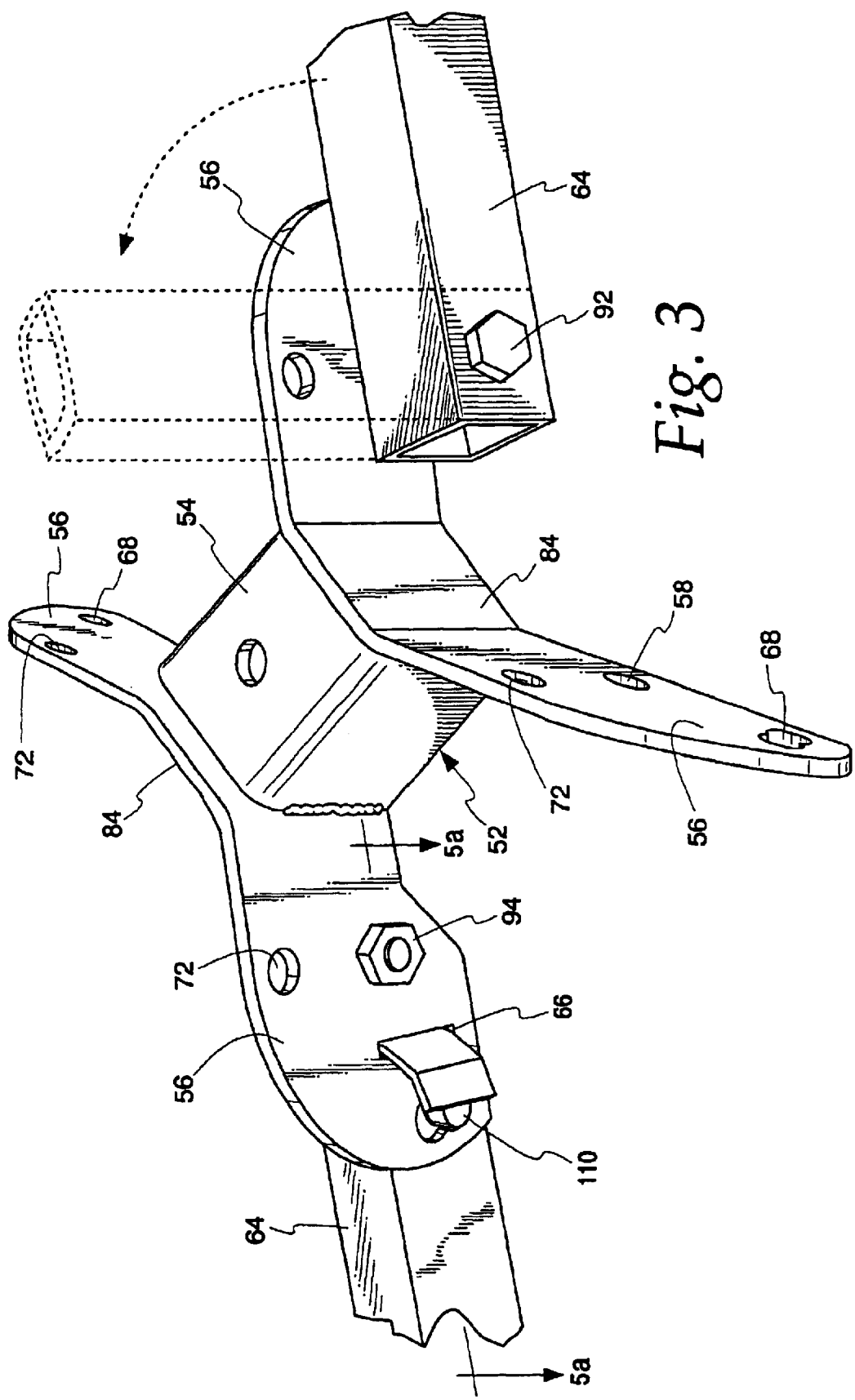
FIG. 3 is a perspective view of the support base portion thereof.
Figure 5A:
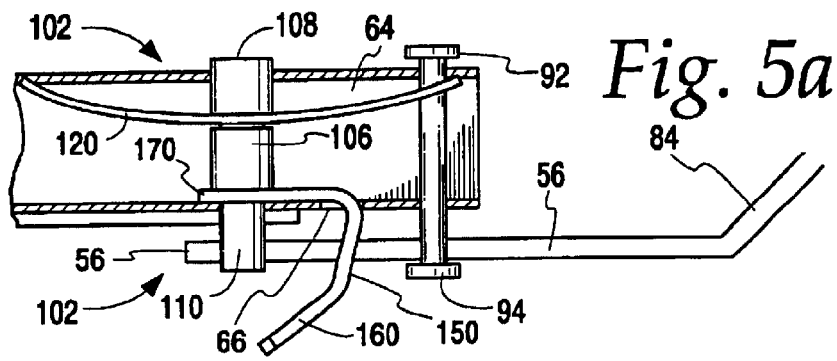
FIG. 5a is a cross-sectional view taken along the line 5a—5a of FIG. 3.
Figure 5B:
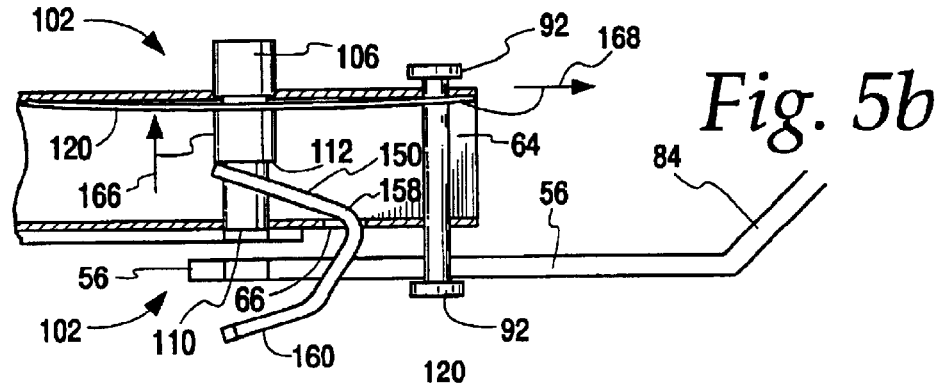
FIG. 5b is a cross-sectional view similar to that of FIG. 5a showing a sequence of operation.
Figure 9:
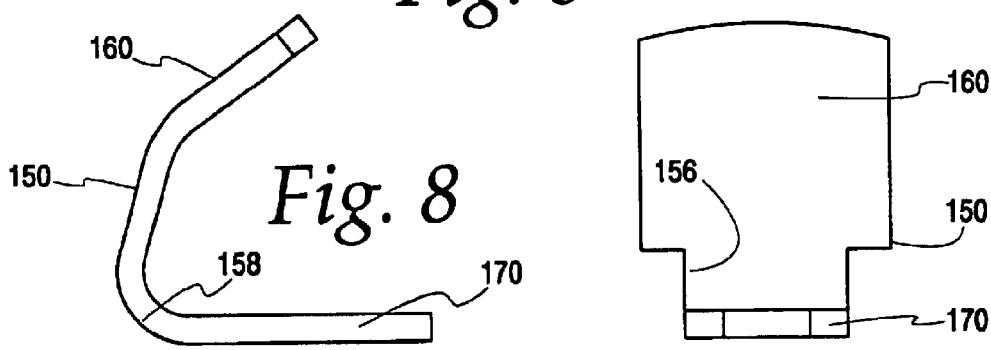
FIG. 9 is a bottom plan view of the actuator component thereof.
Figure 10:
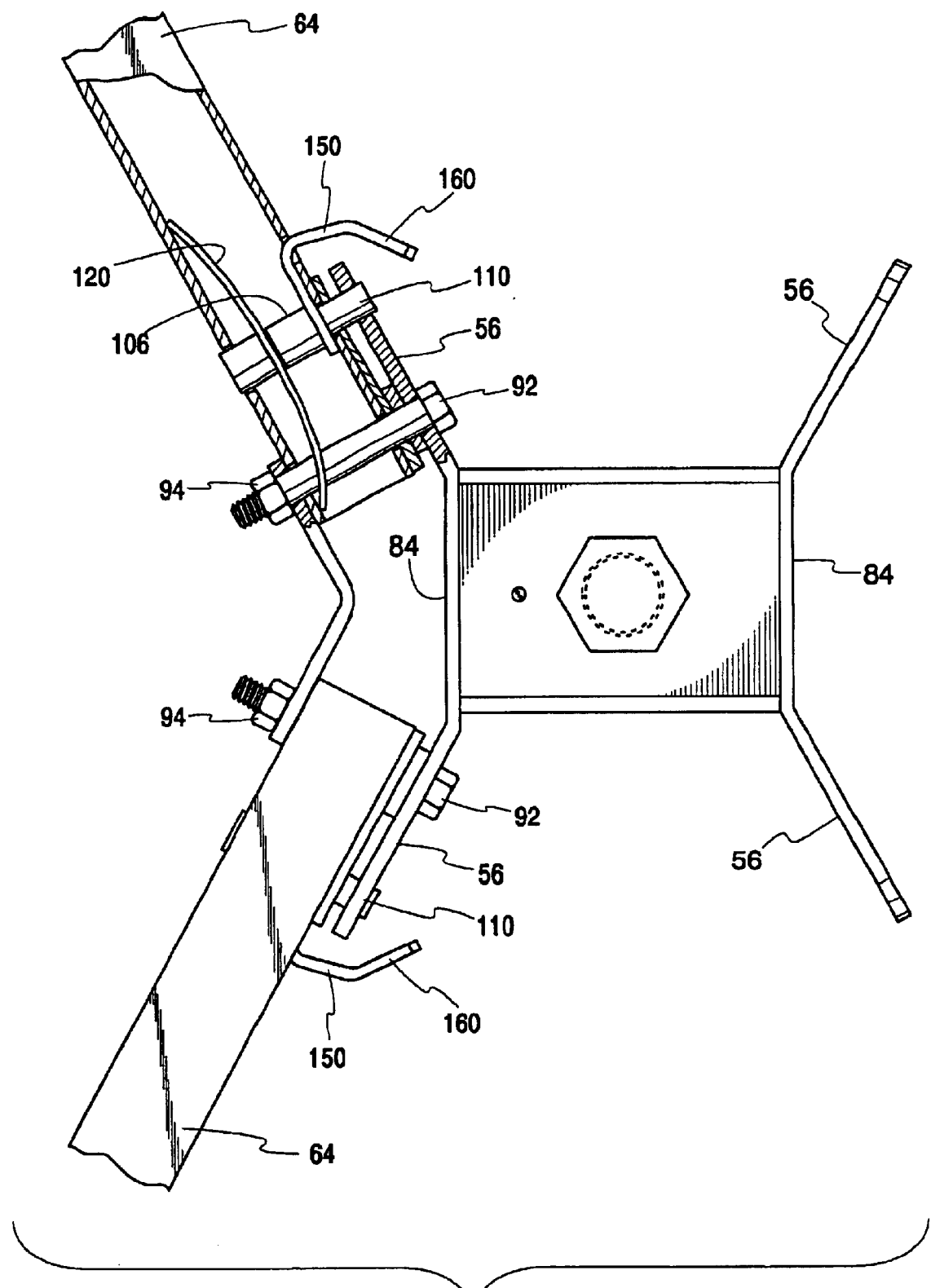
FIG. 10 is a fragmentary bottom plan view of the sign stand assembly.

Referring now to the drawings, and initially to FIG. 1, the sign stand assembly is generally indicated at 10. Sign stand assembly 10 includes a sign panel subassembly 12, which includes a sign panel 14 supported by a horizontal cross member 16 and a vertical cross member 18, preferably in the form of a fiberglass rib. The bottom portion 24 of the fiberglass rib 18 is mounted in a rib clamping device 34, which is supported by a vertical body member 30. Body member 30 is in turn bolted to a bracket 36 resiliently supported by a spring 50. With reference to FIGS. 2 and 3, spring 50 is supported by a support assembly 52 including a platform portion 54 supported between side plates 84. Side plates 84 include ear portions 56 having holes 58 to receive a bolt fastener 92 which provides pivot support for ground-engaging legs 64 (see FIG. 1). Ears 56 further include holes 68 which, as will be seen herein, define an extended or operational configuration of the legs as illustrated in FIG. 1. Ear portions 56 also include holes 72 which define a collapsed storage position for the legs 64, as illustrated for example in FIG. 2. As can be seen in FIGS. 5a and 5b, the tip 110 of locking pin 106 has a reduced diameter to accommodate the clevis or forked end 170 of actuator 150 (see FIG. 9). A shoulder 112 is formed in locking pin 106 for butting engagement with end 170 of actuator 150. Thus, actuator 150 and locking pin 106 form a linkage assembly. Actuator 150 is received in a slot 66 formed in a side wall of leg 64 (see also FIG. 3). Actuator 150 cooperates with leg 64 and locking pin 106 in the manner which maintains actuator 150 captive within the leg. With reference to FIG. 3, it can be seen that the holes 58 which receive the bolt fasteners 92 are located at inner portions of the ears 56 while the locking holes 68, 72 are located at outer portions.

Figure 4:
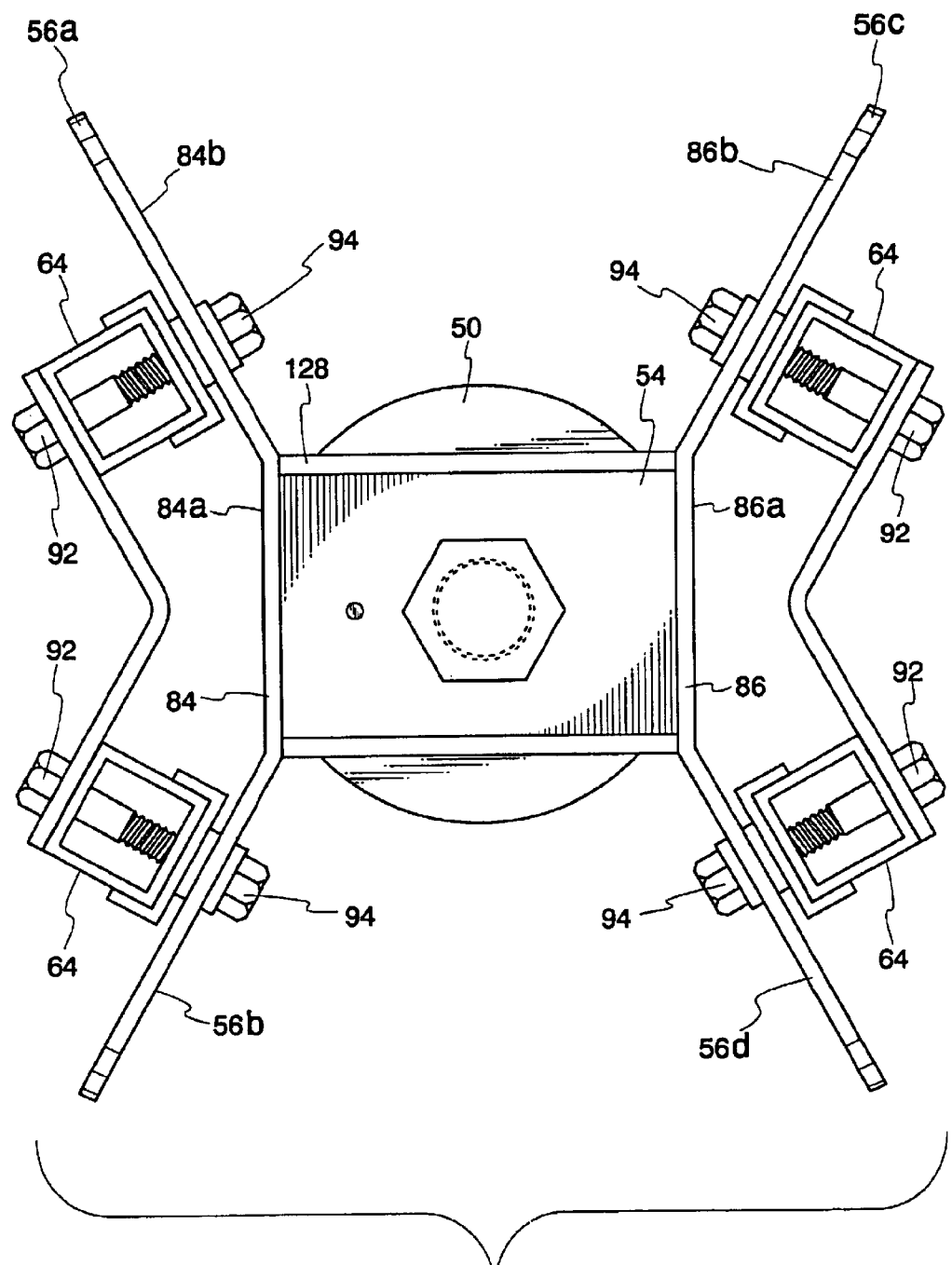
FIG. 4 is a bottom plan view of the arrangement shown in FIG. 2.

Referring to FIG. 4, ear portions 56a, 56b preferably form part of an integral side plate 84 while ear portions 56c, 56d form portions of a second side plate 86. Preferably, side plates 84, 86 are mirror images of one another although this feature is optional, and can be omitted, if desired. With further reference to FIG. 4, it can be seen that the legs 64 extend outwardly from outer surface portions 84a, 86a of side plates 84, 86. Pivot members in the form of bolt fasteners 92 pivotally connect legs 64 to the ear portions of side plates 84, 86. The legs 64 are located to one side of the ear portions with the bolt fasteners passing through the legs and ear portions. Bolt fasteners 92 have heads located adjacent the inner surfaces 84b and 86b. The bolt fasteners 92 extend through legs 64 and are terminated at their free ends by threaded nut fasteners 94. As can be seen in FIG. 4, the legs 64 comprise hollow tubing and have a preferred generally square cross-sectional shape. If desired, legs 64 can have an elongated, rectangular or non-square cross-sectional shape. With reference to FIGS. 3 and 4, bolts 92 pass through holes 58 formed in the ear portions 56 of plates 84, 86.

With reference to FIGS. 5a and 5b, a release assembly is generally indicated at 102. The release assembly 102 selectively interferes with the legs 56 to lock the legs either in the operational position shown in FIG. 1 or the storage position shown in FIG. 2. As mentioned, the legs 64 pivot about bolts 92 which are secured to the inner portions of the ears 56.

Referring to FIGS. 5–10, release assembly 102 includes a locking pin 106 having a head 108 and a tip or free end 110. The locking pin 106 is carried by leg 64 and preferably extends through the hollow interior of the leg. In FIG. 3, the locking pin 106 is illustrated as extending beyond the outer surface of ear 56 for illustrative purposes. If desired, the locking pin 106 can be configured such that the free end 110 is located at or slightly recessed below the outer surface of ear 56.

In FIG. 5a, the locking pin 106 is shown in a fully extended or locked position. In the preferred embodiment, locking pin 106 has a generally cylindrical body although other cross-sectional shapes can be employed, if desired. Locking pin 106 has a first end 110 of reduced diameter compared to the opposed end 108 and remainder of the locking pin body. A stepped shoulder 112 (see FIG. 5b) is formed at the transition of the two diameter sizes of the locking pin. As can be seen in FIGS. 5a and 5b, shoulder 112 provides abutting engagement with the forked or clevis end 170 of actuator 150 (see FIG. 9). As will be seen herein, the large diameter body portion of locking pin 106 is formed with an annular recess for receiving a spring member 120. If desired, the recess need not be annular, but can be comprised of linear recesses cut parallel to a tangent.

Referring to FIGS. 5a and 5b, release assembly 102 further includes a spring member 120. The spring member 120 is preferably of a flat spring construction having first and second ends and a medial portion between the ends. The first end 122 of the spring defines a relatively shallow recess 124 giving the spring end 122 a forked or stirrup configuration. As schematically indicated in FIG. 3, recess 124 at least partially receives bolt 92.

Figure 6:
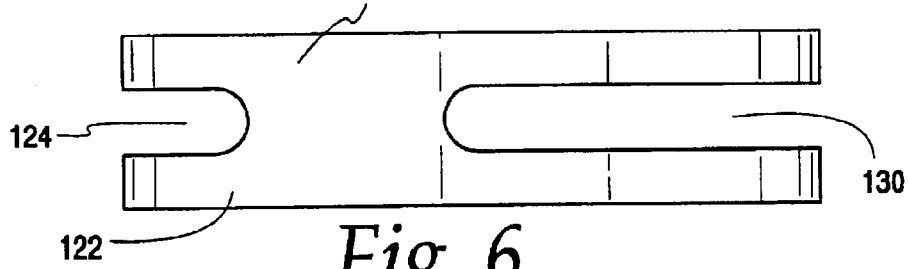
FIG. 6 is a plan view of a spring component thereof.
Figure 8:
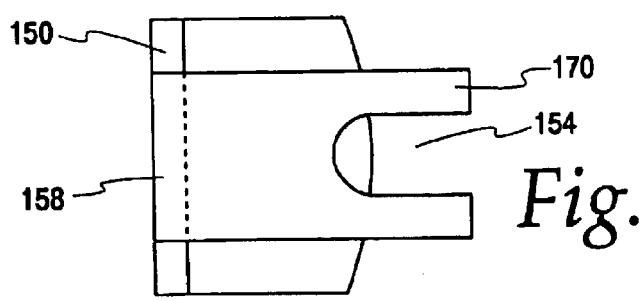
FIG. 8 is an elevational view of the actuator component.
Figure 7:
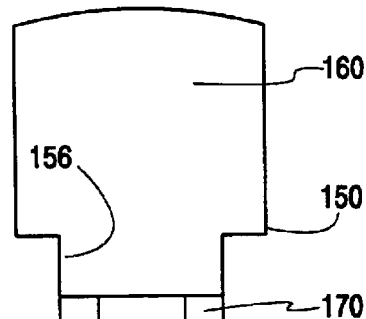
FIG. 7 is a top plan view of an actuator component thereof.

Referring again to FIG. 6, the opposed end 128 of spring 120 defines a relatively deeper recess 130 which extends toward spring end 122. As can be seen in FIG. 6, the recesses 124, 130 are similar to one another, being located along the longitudinal center line of spring 120, but differ in their length.

With reference to FIGS. 5a and 5b, the free end 128 of spring 120 is free to move back and forth, toward and away from bolt 92 and locking pin 106. Recess 130 is made sufficiently long so as to permit locking pin 106 to extend through recess 130 in the manner indicated.

Referring again to FIGS. 5–9, release assembly 102 further includes an actuator 150 having a generally curved or C-shaped body including a first end 170 with a recess 154 for receiving bolt 92. The opposed end 158 of actuator 150 includes a handle or tab 160 having a rounded free end portion. In the preferred embodiment, the tab 160 of actuator 150 is relatively flat although it can take on a non-flat or profiled shape, if desired.

Referring again to FIG. 7, the central portion 156 of actuator 150 defines a stepped portion of reduced width allowing the actuator to be inserted through the slot 66 in leg 64. The shoulders formed at the transition of the tab 160 and central portion 156 help to hold actuator 150 captive in leg 64, while allowing the actuator to undergo a rocking action about its curved portion 158 (see FIG. 8).

Figure 11:
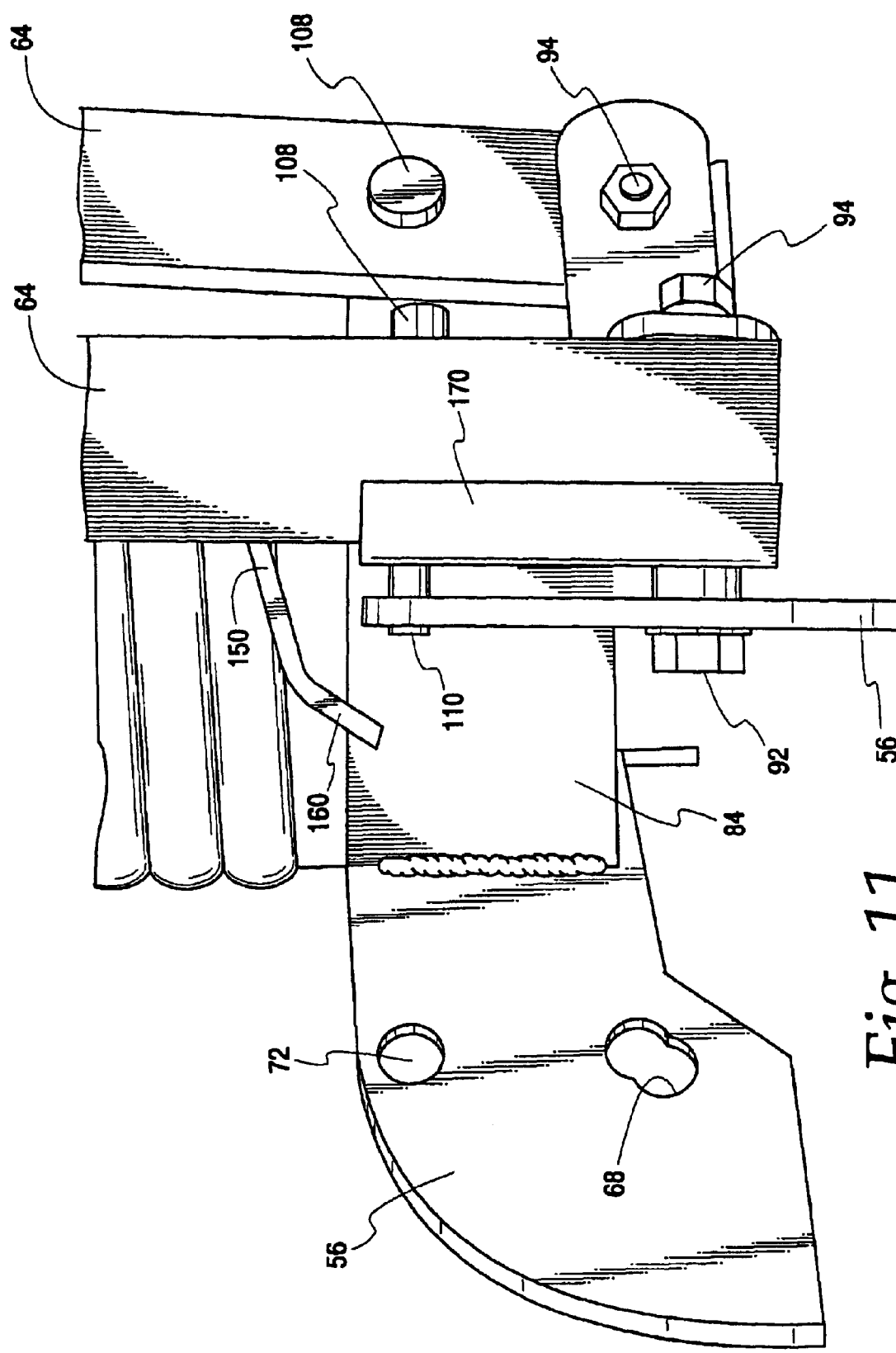
FIG. 11 is a fragmentary elevational view of the sign stand of FIG. 2.

Referring again to FIGS. 5a and 5b, as tab 160 is depressed, locking pin 106 is moved in the direction of arrow 166 (see FIG. 5b), due to the interlocking of actuator 150 and pin 106. As tab 160 is depressed, the slotted portion of locking pin 106 pushes against spring 120 causing the spring to compress or flatten slightly, with free end 128 of the spring moving in the direction of arrow 168 (see FIG. 5b). This stores spring energy which urges actuator 150 to return to its rest position illustrated in FIG. 5a. With tab 160 sufficiently depressed (see FIG. 5b), the free end 110 of locking pin 106 is made to clear the plate ear portion 56, allowing the leg to be pivoted about bolt fastener 92, with the leg assuming its desired orientation. Referring to FIG. 11, a U-shaped shield plate 170 is secured to the outer surface of leg 64 which faces ear portion 56. Preferably, leg 64 is made of relatively soft aluminum material desirable for its strength and relatively lightweight characteristics. The optional shield 170 toughens the outer surface of leg 64 which would otherwise be subjected to wear as the leg 64 is pivoted between its collapsed or rest position (see FIG. 2) and its extended or operating position (see FIG. 1). Shield 170 is preferably made of a mild steel material.

Referring to FIGS. 2 and 11, it will be seen that the tab portion 160 is slightly curved or bent with respect to the adjacent body portion of actuator 150. This configuration effectively shields the free end 110 of the locking pin 106 and presents a conveniently engageable surface for the operator of the supporting device. When employed with a sign stand arrangement, such as that illustrated in FIG. 1, an operator can rest the collapsed supporting device (see FIG. 2) on the ground, and use the actuator as a foot operated release while guiding the free ends of legs 64 to their desired positions as shown in FIG. 1. As shown in FIG. 5b, the locking pin 106 is "bottomed out" with full travel of actuator 150. At this extreme position, tab portion 160 is preferably maintained a spaced distance from ear portion 56.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and

What is claimed is:

1. A sign stand assembly comprising:
 a sign panel;
 a support base;
 an upright mast joining the sign panel and support base;
 said support base including a plate portion defining a locking recess;
 a plurality of legs, at least one leg having a wall defining a hollow interior of the leg;
 pivotal connections pivotally connecting the legs to the plate portions;
 a locking pin carried on said at least one leg, for movement toward and away from the locking recess defined by said at least one leg; and
 an actuator having a first end portion within said at least one leg for engaging said locking pin, an opposed second end portion with an outwardly protruding tab at least partially overlying said plate portion and a medial portion extending through said wall and cooperating with said wall and said locking pin to maintain said actuator captively engaged with said leg.

2. The sign stand assembly of claim 1 wherein said locking pin extends through said at least one leg.

3. The sign stand assembly according to claim 1 wherein said actuator first end portion, second end portion and medial portion include generally flat plate bodies, with said medial portion joined by curved parts to said first and said second end portions.

4. The sign stand assembly of claim 1 wherein said locking pin has a generally cylindrical body with a second end portion of predetermined size remote from said plate portion and an opposed first end portion of reduced size adjacent said plate portion, with a stepped shoulder between said first and said second end portions.

5. The sign stand assembly according to claim 4 wherein the second end portion defines a spring-receiving recess and said sign stand assembly further comprises a flat spring with a first end having a clevis portion at least partly slidably received in said spring-receiving recess, said spring urging said tab away from said wall of said at least one leg.

6. The sign stand assembly according to claim 5 wherein the flat spring includes a second end having a clevis portion engaging the pivotal connection of said at least one leg.

7. The sign stand assembly according to claim 1 wherein said tab extends toward the pivotal connection of said at least one leg.

8. The sign stand assembly according to claim 4 wherein said first end portion of said actuator includes a clevis portion receiving at least a part of the first end portion of said locking pin and dimensioned for interfering contact with the stepped shoulder of said locking pin to transfer an actuating force to said locking pin to move said locking pin away from said locking recess.

9. The sign stand assembly according to claim 6 wherein the pivotal connection of said at least one leg comprises a bolt fastener extending through said plate portion and said at least one leg.

10. A sign stand assembly comprising:
 a support base defining a locking recess, the support base providing support for the sign stand assembly;
 a leg comprising a hollow rigid tube;
 a pivotal connection member having an elongated body pivotally attaching said leg to said support base;
 a locking pin extending through said tube for movement toward and away from the locking recess;
 an actuator having a first end portion within said at least one leg for engaging said locking pin, an opposed second end portion with an outwardly protruding tab at least partially overlying said plate portion and a medial portion extending through said wall and cooperating with said wall and said locking pin to maintain said actuator captively engaged with said leg, said actuator first end portion defining an opening for receiving said locking pin in interlocking engagement therewith;
 said tab engageable to move said actuator away from the locking recess; and
 a spring member within said tube engaging said locking pin to urge the locking pin toward the locking recess.

11. The sign stand assembly according to claim 10 wherein said locking pin has a generally cylindrical body with a second end portion of predetermined size remote from said plate portion and an opposed first end portion of reduced size adjacent said plate portion, with a stepped shoulder between said first and said second end portions.

12. The sign stand assembly according to claim 11 wherein said first end portion of said actuator includes a clevis portion receiving at least a part of the first end portion of said locking pin and dimensioned for interfering contact with the stepped shoulder of said locking pin to transfer an actuating force to said locking pin to move said locking pin away from said locking recess.

13. The sign stand assembly according to claim 10 wherein the pivotal connection of said leg comprises a bolt fastener extending through said plate portion and said leg.

14. The sign stand assembly according to claim 10 wherein said tab extends toward the pivotal connection of said at least one leg.

15. The sign stand assembly of claim 1 wherein said locking pin has a generally cylindrical body with a second end portion of predetermined size remote from said plate portion and an opposed first end portion of reduced size adjacent said plate portion, with a stepped shoulder between said first and said second end portions, the second end portion defining a spring-receiving recess and said sign stand assembly further comprises a flat spring with a first end having a clevis portion at least partly slidably received in said spring-receiving recess, said spring urging said tab away from said wall of said at least one leg.

16. The sign stand assembly according to claim 15 wherein the flat spring includes a second end having a clevis portion engaging the pivotal connection of said at least one leg.

* * * * *